(12) United States Patent
Blackburn et al.

(10) Patent No.: US 9,046,619 B2
(45) Date of Patent: Jun. 2, 2015

(54) METHOD AND APPARATUS TO MONITOR A BEAM OF IONIZING RADIATION

(75) Inventors: Brandon W. Blackburn, Idaho Falls, ID (US); David L. Chichester, Idaho Falls, ID (US); Scott M. Watson, Idaho Falls, ID (US); James T. Johnson, Rigby, ID (US); Mathew T. Kinlaw, Idaho Falls, ID (US)

(73) Assignees: Raytheon Company, Waltham, MA (US); U.S. Department of Energy, Washington, DC (US)

( * ) Notice: Subject to any disclaimer, the term of this patent is extended or adjusted under 35 U.S.C. 154(b) by 632 days.

(21) Appl. No.: 13/326,970

(22) Filed: Dec. 15, 2011

(65) Prior Publication Data

US 2013/0153773 A1 Jun. 20, 2013

(51) Int. Cl.
*G01T 1/205* (2006.01)
*G01T 1/20* (2006.01)
*G01V 5/00* (2006.01)

(52) U.S. Cl.
CPC .................................. *G01V 5/0016* (2013.01)

(58) Field of Classification Search
CPC ............ H05H 3/00; H05H 3/02; G01T 1/178; G01T 1/185; H01J 37/1471
USPC ............ 250/251, 390.01, 361 R, 362, 396 R, 250/397, 398, 399, 400, 370.02, 389, 250/396 ML See application file for complete search history.

(56) References Cited

U.S. PATENT DOCUMENTS

| | | | | |
|---|---|---|---|---|
| 3,768,908 A * | 10/1973 | Zaromb | ....................... | 356/338 |
| 3,955,089 A * | 5/1976 | McIntyre et al. | ............ | 250/399 |
| 3,980,885 A * | 9/1976 | Steward et al. | ............... | 250/307 |
| 4,058,832 A * | 11/1977 | Vagi | ............................. | 348/162 |
| 4,713,581 A * | 12/1987 | Haimson | ...................... | 315/5.41 |
| H755 H * | 3/1990 | Karl, Jr. | .................... | 250/458.1 |
| 5,233,990 A * | 8/1993 | Barnea | ........................ | 600/427 |
| 5,286,973 A * | 2/1994 | Westrom et al. | ............. | 250/253 |
| 5,388,769 A * | 2/1995 | Rodrigo et al. | ............... | 239/690 |
| 5,704,890 A * | 1/1998 | Bliss et al. | ........................ | 600/1 |
| 5,717,214 A * | 2/1998 | Kitamura et al. | ......... | 250/370.1 |
| 5,786,889 A * | 7/1998 | Pope et al. | ................. | 356/152.1 |
| 5,850,120 A * | 12/1998 | Okamoto | ...................... | 313/336 |
| 6,281,502 B1 * | 8/2001 | Pineau et al. | ............. | 250/361 R |
| 6,490,530 B1 * | 12/2002 | Wyatt | .............................. | 702/24 |
| 7,308,203 B1 * | 12/2007 | Koenck et al. | ............... | 398/118 |
| 7,515,681 B2 * | 4/2009 | Ebstein | ........................... | 378/19 |
| 7,629,588 B1 | 12/2009 | Bell et al. | | |
| 7,710,051 B2 * | 5/2010 | Caporaso et al. | ............ | 315/505 |
| 7,773,204 B1 * | 8/2010 | Nelson | ......................... | 356/5.02 |
| 8,049,870 B2 * | 11/2011 | Mosier et al. | .................... | 356/29 |
| 2004/0120844 A1 * | 6/2004 | Tribelsky et al. | ................ | 422/2 |
| 2006/0022115 A1 * | 2/2006 | Byren | ........................ | 250/201.9 |
| 2006/0231771 A1 * | 10/2006 | Lee et al. | .................... | 250/458.1 |
| 2007/0181815 A1 * | 8/2007 | Ebstein | ..................... | 250/370.11 |

(Continued)

FOREIGN PATENT DOCUMENTS

JP 2011130859 A * 7/2011

*Primary Examiner* — David Porta
*Assistant Examiner* — Djura Malevic
(74) *Attorney, Agent, or Firm* — Daly, Crowley, Mofford & Durkee, LLP

(57) ABSTRACT

Methods and apparatus to capture images of fluorescence generated by ionizing radiation and determine a position of a beam of ionizing radiation generating the fluorescence from the captured images. In one embodiment, the fluorescence is the result of ionization and recombination of nitrogen in air.

15 Claims, 4 Drawing Sheets

(56) References Cited

U.S. PATENT DOCUMENTS

| | | | |
|---|---|---|---|
| 2008/0149838 A1* | 6/2008 | Parvin | 250/356.2 |
| 2008/0159473 A1* | 7/2008 | Clay | 378/45 |
| 2009/0040299 A1* | 2/2009 | Harrison et al. | 348/135 |
| 2009/0078883 A1* | 3/2009 | Perel et al. | 250/396 R |
| 2010/0059665 A1* | 3/2010 | Sampayan | 250/251 |
| 2010/0265078 A1 | 10/2010 | Friedman | |
| 2011/0006212 A1* | 1/2011 | Shchory et al. | 250/363.01 |
| 2012/0112076 A1* | 5/2012 | Rosson et al. | 250/361 R |

* cited by examiner

METHOD AND APPARATUS TO MONITOR A BEAM OF IONIZING RADIATION

STATEMENT REGARDING FEDERALLY SPONSORED RESEARCH

This invention was made with Government support under Contract No. DE-AC07-05ID14517 awarded by the United States Department of Energy. The Government has certain rights in this invention.

BACKGROUND

As is known in the art, radiation beams are useful in a wide variety of applications, such as medical treatment, active interrogation systems, and the like. As is also known, such radiation beams can be harmful or lethal if not steered accurately.

Conventional techniques to determine beam location, especially from high-current and high average power machines, rely on the beam being adjusted down dramatically in power while mechanically aligned with respect to a given target and fiducials. The targets are then removed and the current is increased to nominal levels. Alternately, a series of dosimeters can be placed at known locations, such as in a particular grid pattern. By reading the dosimeters, a map of the beam location can be determined. The amount of time and labor required to determine the locations of the dosimeters, to place the dosimeters, to read the dosimeters, and to determine beam location information from the dosimeters, will be readily appreciated by one of ordinary skill in the art. It is also understood that both configurations do not enable real time monitoring of the beam.

However, in some applications it is not possible to visually assess the spatial extent or direction of travel, of ionizing radiation in the atmosphere. In the field of radiation oncology, for example, it would be helpful to be able to see the radiation emanating from therapeutic treatment tools in order to confirm the tools are operating in good working order, and to confirm that complex 2-dimensional (2-D) radiation treatment profiles are correct and directed correctly at patients. In the nuclear power industry, for example, dangerously-high radiation fields may be encountered in the vicinity of occupied areas where humans must be present to do their work, such as on the turbine deck of a boiling water reactor power plant or on the catwalk above a spent-fuel storage pool. In these instances it would be useful to have diagnostic tools to detect and assess the radiation fields in areas prior to human entry and activity.

Also, a number of known types of electronic radiation detection systems are currently used in various applications. One such application is stand-off active interrogation (SOAI) systems utilizing high-energy ionizing-radiation beams in air during for detecting various materials. The energy of the particles SOAI systems can vary widely and the distances at which these beams operate extend can also vary. There is a need to ensure these irradiation systems are functioning correctly and pointing in the right direction for correctly targeting a desired interrogation region.

SUMMARY

The present invention provides exemplary method and apparatus embodiments for monitoring beams of ionizing radiation. Intensely ionizing beams of radiation stimulate the emission of ultra violet (UV) light through the ionization and recombination of naturally occurring isotopes in the atmosphere, including nitrogen and nitrogen-containing compounds. UV light is generated from the prompt-fluorescence decay of nitrogen in the atmosphere following atomic excitation caused by energetic electrons from photons or protons. The fluorescence decay of nitrogen, for example, yields a polychromatic spectrum of discrete wavelengths from the near-UV (NUV) range to the infrared (IR) spectrum). The most intense emissions are in the 300-400 nm range. By utilizing a UV sensitive CCD (charge coupled device) camera and/or UV sensitive PMT to directly image the profile of the high energy beam in the air, an ionizing beam can be monitored and its position determined. In one embodiment, beam position can be controlled through a feedback mechanism using detected beam position information from one or more cameras.

With this arrangement, real-time monitoring and control of intensely ionizing radiation beams is achieved. In contrast to known techniques to determine beam position, the need for post-experiment manipulation of dosimeters is eliminated. In addition, no direct interaction with the ionizing beam is required.

In one aspect of the invention, a method comprises capturing images of fluorescence generated by a beam of ionizing radiation, and determining a position of the beam of ionizing radiation generating the fluorescence from the captured images, and using the captured images to steer the beam.

The method can further include one or more of the following features: capturing the images of fluorescence in air, the fluorescence results from ionization and recombination of nitrogen molecules, and/or using an ultra violet camera to capture the images of fluorescence, using an array of cameras to capture the images of fluorescence.

In a further aspect of the invention, a system comprises an image acquisition system to capture images of fluorescence generated by a beam of ionizing radiation, and a control module to determine a position of the beam of ionizing radiation generating the fluorescence from the captured images to steer the beam using the captured images.

The system can further include one or more of the following features: the image acquisition system comprises at least one camera, the system comprises an active interrogation system for interrogating an object of interest, the image acquisition system captures recombination of Nitrogen molecules, the image acquisition system captures ultra-violet light, the image acquisition system operates in the solar blind region of the spectrum, and/or a beam source to interrogate an object of interest.

In another aspect of the invention, a system comprises a means for receiving images of fluorescence generated by a beam of ionizing radiation, and a means for determining a position of the beam generating the fluorescence from the images, and a steering means to steer the beam of ionizing radiation from the images.

The system can further include one or more of the following features: the means for receiving images comprises an array of cameras, a means for generating the beam of ionizing radiation, a feedback means to steer the beam of ionizing radiation, and/or the fluorescence is generated by recombination of nitrogen molecules.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention provide methods and apparatus for locating and analyzing the spatial extent of high-energy beams of radiation in air. In one embodiment, a camera is used to detect the recombination of particles, such as nitrogen, ionized by high energy ionizing radiation. It is known that high energy beams of radiation interact with molecules in the air, such as Nitrogen, resulting in the ionization of the molecules. As recombination occurs, light is generated at various wavelengths, e.g., 250-400 nm, to form spectral patterns. The generated light can be imaged for direct monitoring of beam location. In one embodiment, the position of the detected light can provide feedback to a beam steering mechanism to enhance targeting of the beam.

Figure 1:
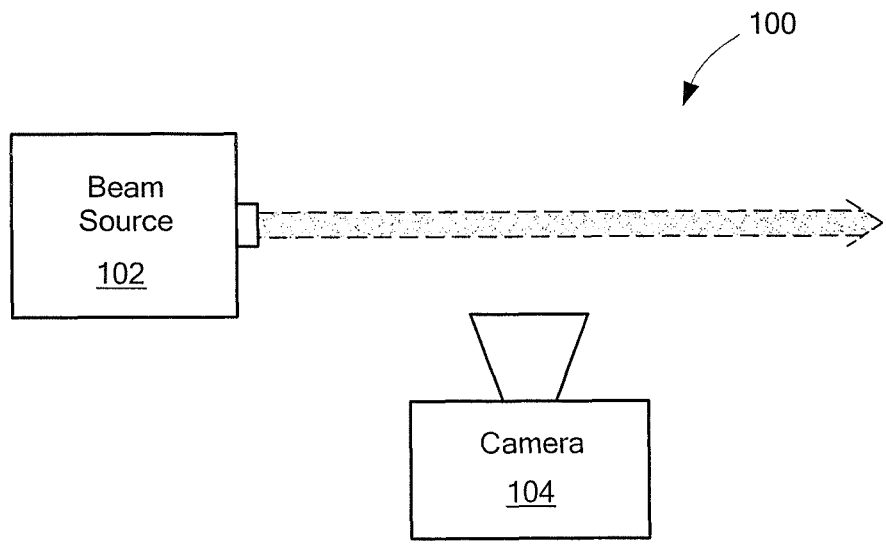
FIG. 1 is a schematic representation of an exemplary radiation monitoring system in accordance with exemplary embodiments of the invention.
Figure 2:
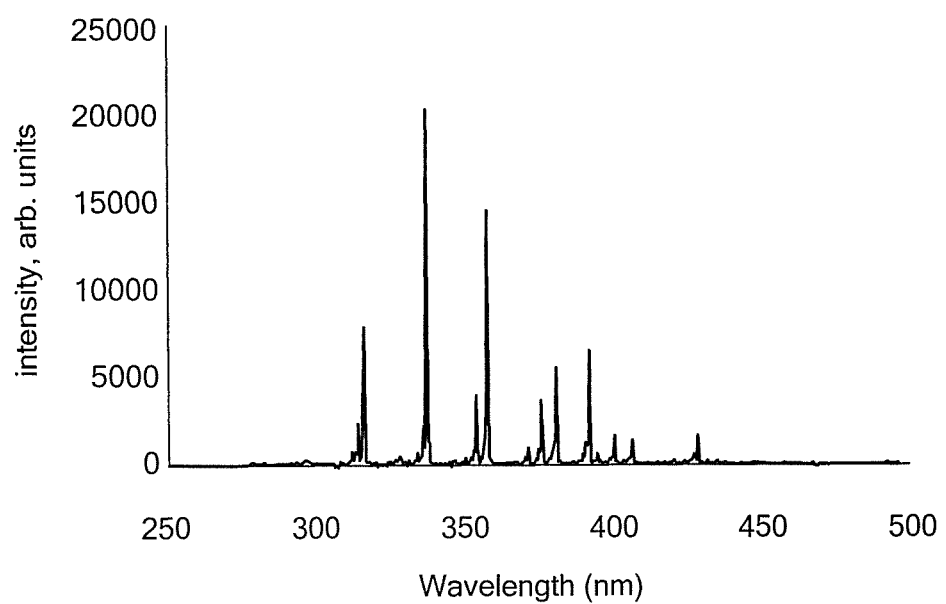
FIG. 2 is diagram of the fluorescence emission spectrum for nitrogen.

FIG. 1 shows an exemplary beam monitoring system 100 including a beam generator 102 and a camera 104 to detect fluorescence emission from air particles, such as nitrogen. In general, the camera 104 should detect ultra-violet (UV) light, such as fluorescence emission from nitrogen. The energy level of the ionizing radiation determines the emission spectrum for the nitrogen or other particles. FIG. 2 shows an exemplary fluorescence emission spectrum for nitrogen. The primary window of interest for UV detection falls between 300-400 nm regardless of the energy of the incident radiation.

Figure 3:
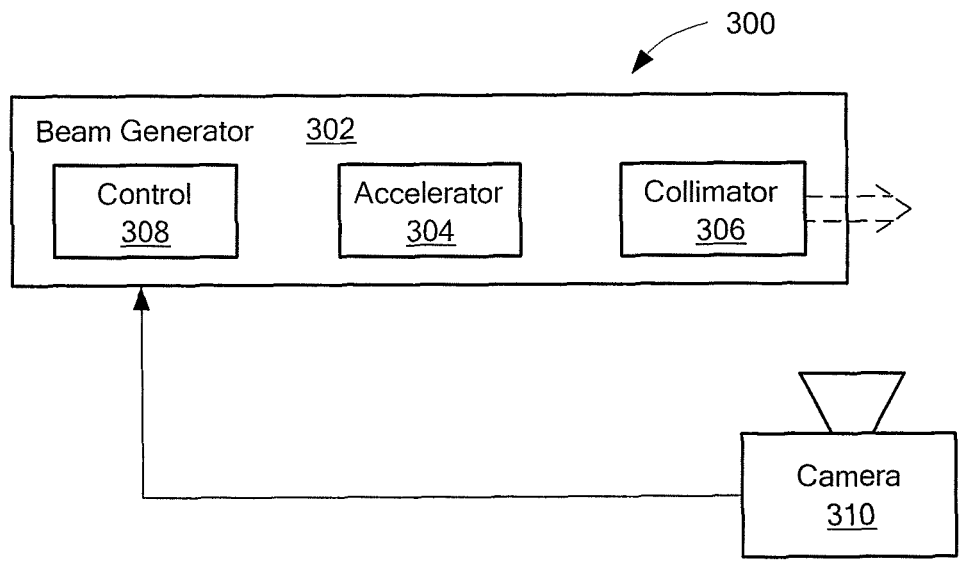
FIG. 3 is a schematic representation of an exemplary beam monitoring system having beam position feedback.

In one embodiment shown in FIG. 3, a system 300 includes beam monitoring with a feedback mechanism to provide information on the beam location for accurately positioning the beam. A beam generator 302 includes an accelerator 304 transmitting energy to a collimator 306 in a conventional manner. A control module 308 controls overall operation of the beam generator including energy level, beam steering etc.

The system 300 includes a camera 310 to detect/image fluorescence from nitrogen, for example, when the beam generator 302 is actively emitting ionizing radiation. The camera 310 has a known position in relation to the beam generator. Based upon the location of the detected fluorescence, the control module 308 can determine the position of the beam.

Figure 4:
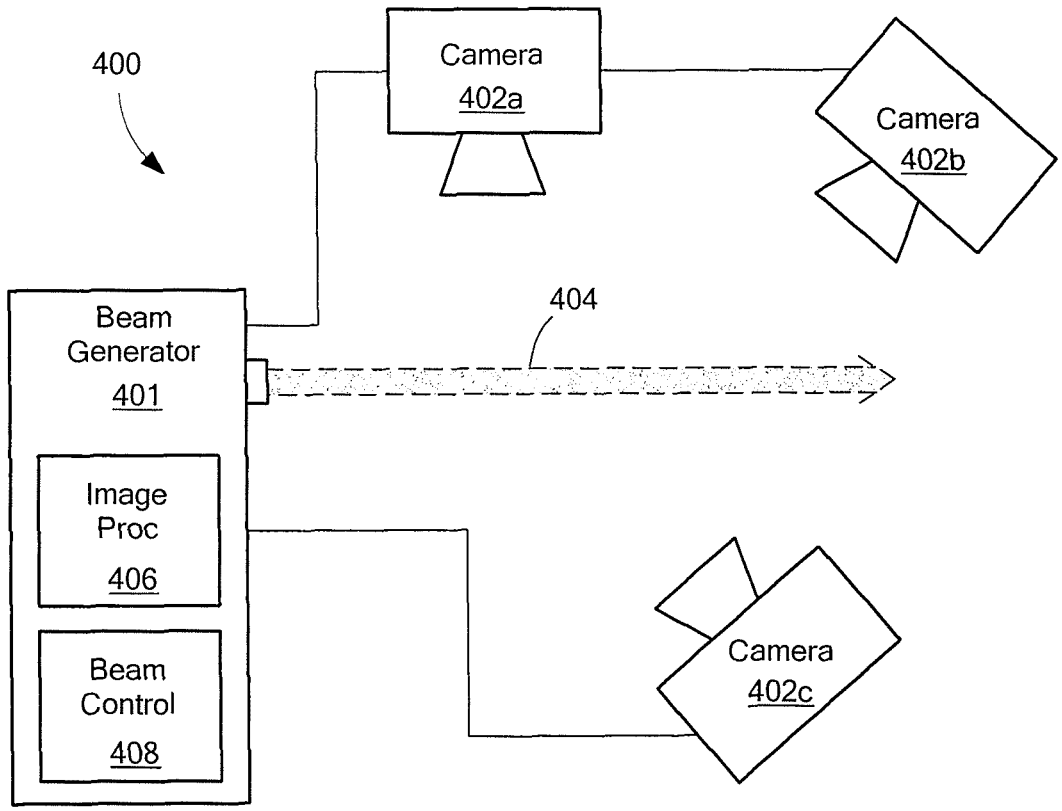
FIG. 4 is a schematic representation of an exemplary beam monitoring system having a camera array.

It is understood that any practical number of cameras can be used to obtain a desired level of accuracy for detected beam location. FIG. 4 shows a system 400 including a beam generator 401 and an array of UV cameras 402a-c to detect fluorescence from a beam 404 of ionizing radiation. Images from the cameras 402, which are placed at various locations in relation to the beam generator 401, are transmitted to an image processing module 406 for processing to identify locations at which nitrogen fluorescence is present. Based upon the regions of detected fluorescence, a beam control module 408 can steer the beam utilizing a feedback mechanism between the UV imaging and the beam steering.

It is understood that any practical technique to determine the spatial location of an acquired image can be used to determine beam location from the fluorescence. A variety of location processing techniques will be readily apparent to one of ordinary skill in the art.

In one embodiment, it is preferable to operate in the solar blind region, e.g., below about 300 nm, so as to greatly increase the signal-to-noise ratio (SNR). It is understood that a sufficiently high energy level for the radiation beam is required for operation in the solar blind region. An advantage to working in the solar blind region is that the background signal from solar radiation is greatly reduced when looking below 300 nm. Operation during daylight hours requires significant filtering in the region above 300 nm.

Figure 5:
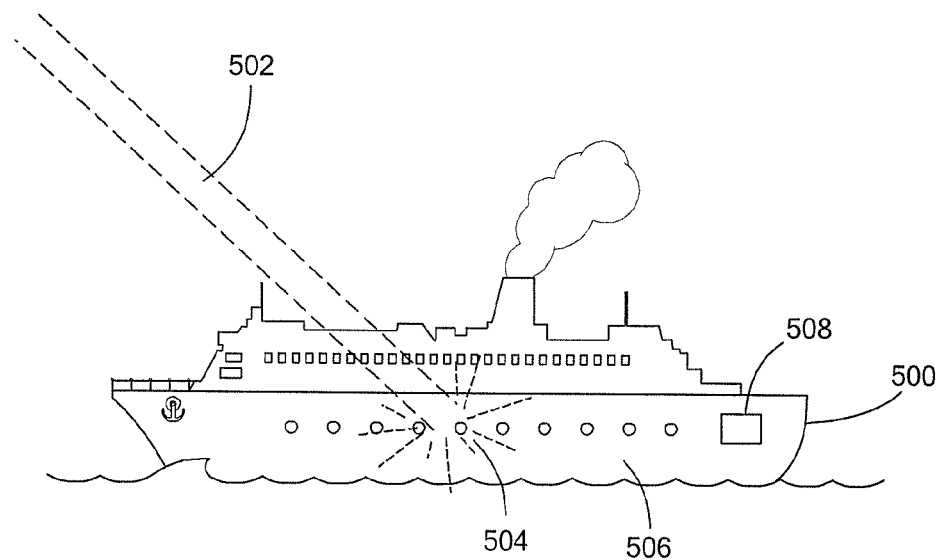
FIG. 5 is a schematic representation of an exemplary beam monitoring system for a structure.

In another embodiment, radiation from an irradiated object is detected. As shown in FIG. 5, for example, when a ship 500 is struck by ionizing radiation 502 fluorescence 504 reflected from the ship surface 506 can be detected by a detection system 508 in accordance with exemplary embodiments of the invention. It is understood that any practical number of detection systems 508 can be placed about a vehicle, aircraft, or any structure, to detect fluorescence from ionizing radiation.

Figure 6:
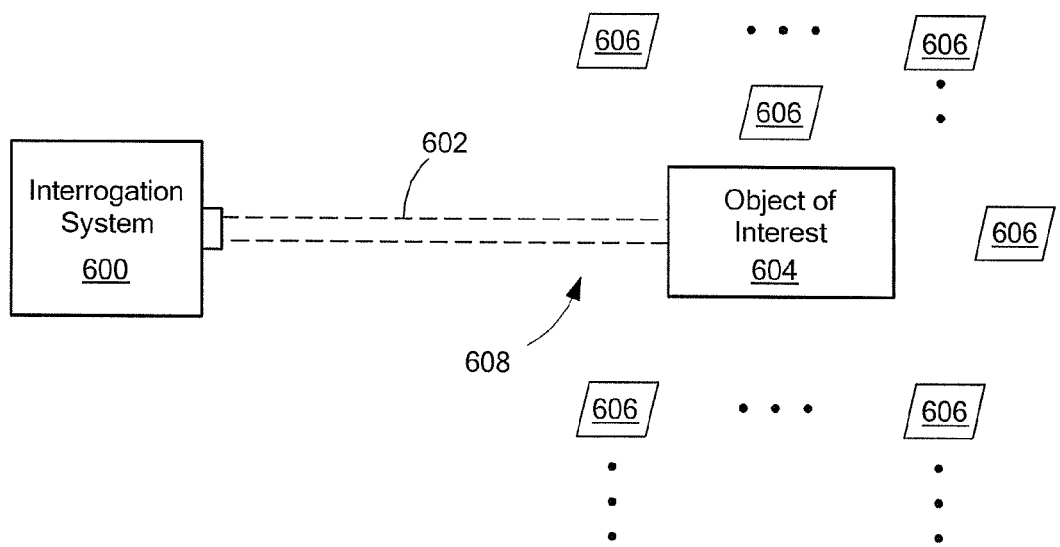
FIG. 6 is a schematic representation of an exemplary active interrogation system having beam monitoring.

In a further embodiment shown in FIG. 6, an active interrogation system 600 directs an ionizing beam of radiation 602 at an object of interest 604. A series of detection systems 606 are placed about the interrogation area 608 to determine if the beam 602 position is correct and/or to determine whether the interrogation area 608 contains reflected energy. In one embodiment, an alert and/or shutdown sequence can be activated upon the detection of ionizing radiation.

It is understood that any suitable camera suited to capturing images of fluorescence can be used. In one particular embodiment, a UV-Imaging CCD Camera, and more particularly, an electronmultiplying charge-coupled device (EMCCD) scientific camera manufactured by ANDOR Technology, model name: iXon+ can be used. The camera has a quantum efficiency of approximately 35% in the NUV light band. A JENOPTIX UV-VIS-IR, 60-mm, UV-corrected 1:4 lens was used with the camera. This lens has good UV-light transmission over the NUV range of interest for fluorescence and Cherenkov-light imaging with approximately 40% transmission at 300 nm and 84% at 400 nm. The camera operated with 16-bit digitization. A 330-nm notch filter and a red-leak filter were used to reduce off-UV ambient light. The camera was operated using a standard personal computer.

Figure 7:
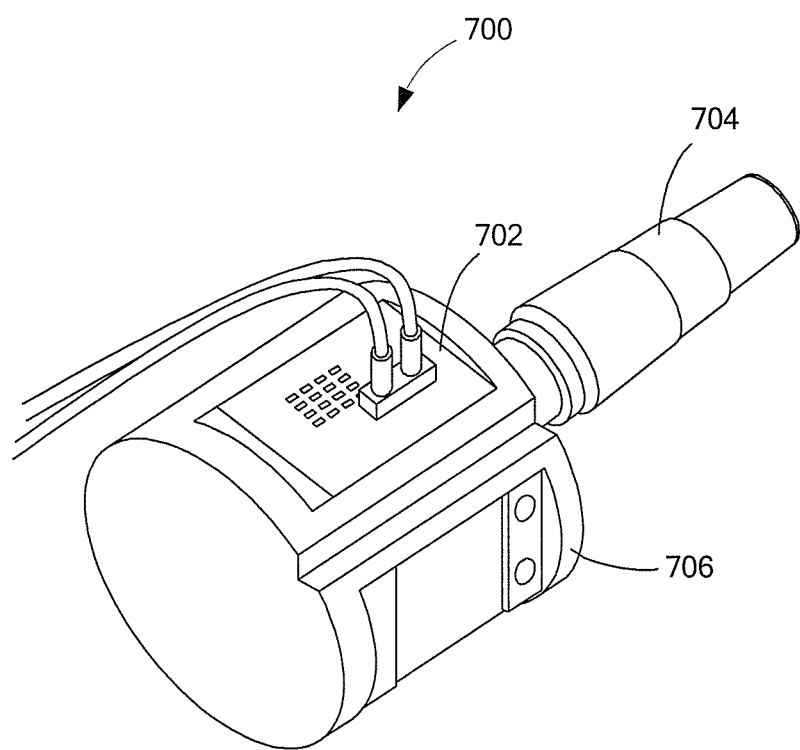
FIG. 7 is a pictorial representation of a camera system for capturing fluorescence image information.

FIG. 7 shows an exemplary imaging system 700 including a camera 702 with a 105 mm lens 704 for imaging UV light. The system includes a water chiller unit 706 to cool the CCD to −110 degrees, for example, which allows hyper-gain EM for single photon counting due to a low noise floor.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   capturing images of fluorescence in air generated by a beam of ionizing radiation using an array of cameras to capture the images of fluorescence; and
   determining a position of the beam of ionizing radiation generating the fluorescence from the captured images; and
   using the captured images to steer the beam.

2. The method according to claim 1, wherein the fluorescence results from ionization and recombination of nitrogen molecules.

3. The method according to claim 1, further including using an ultra violet camera to capture the images of fluorescence.

4. A system, comprising:
   an image acquisition system to capture images of fluorescence in air generated by a beam of ionizing radiation; and
   a control module to determine a position of the beam of ionizing radiation generating the fluorescence from the captured images to steer the beam using the captured images.

5. The system according to claim 4, wherein the image acquisition system comprises at least one camera.

6. The system according to claim 4, wherein the system comprises an active interrogation system for interrogating an object of interest.

7. The system according to claim 4, wherein the image acquisition system captures recombination of Nitrogen molecules.

8. The system according to claim 4, wherein the image acquisition system captures ultra-violet light.

9. The system according to claim 4, wherein the image acquisition system operates in the solar blind region of the spectrum.

10. The system according to claim 4, further including a beam source to interrogate an object of interest.

11. A system, comprising:
    a means for determining a position of a beam of ionizing radiation generating fluorescence in air from captured images of the fluorescence generated by the beam of ionizing radiation; and
    a processing means to determine steering of the beam of ionizing radiation from the images.

12. The system according to claim 11, further including a means for receiving images comprising an array of cameras.

13. The system according to claim 11, further including a means for generating the beam of ionizing radiation.

14. The system according to claim 11, further including a feedback means to steer the beam of ionizing radiation.

15. The system according to claim 11, wherein the fluorescence is generated by recombination of nitrogen molecules.

* * * * *